R. SUMMERSGILL.
WINDOW GLASS APPARATUS.
APPLICATION FILED AUG. 10, 1916.

1,220,906.

Patented Mar. 27, 1917.
4 SHEETS—SHEET 1.

Witness

Inventor
Richard Summersgill.

By Foster Auerbacher,
Attorneys.

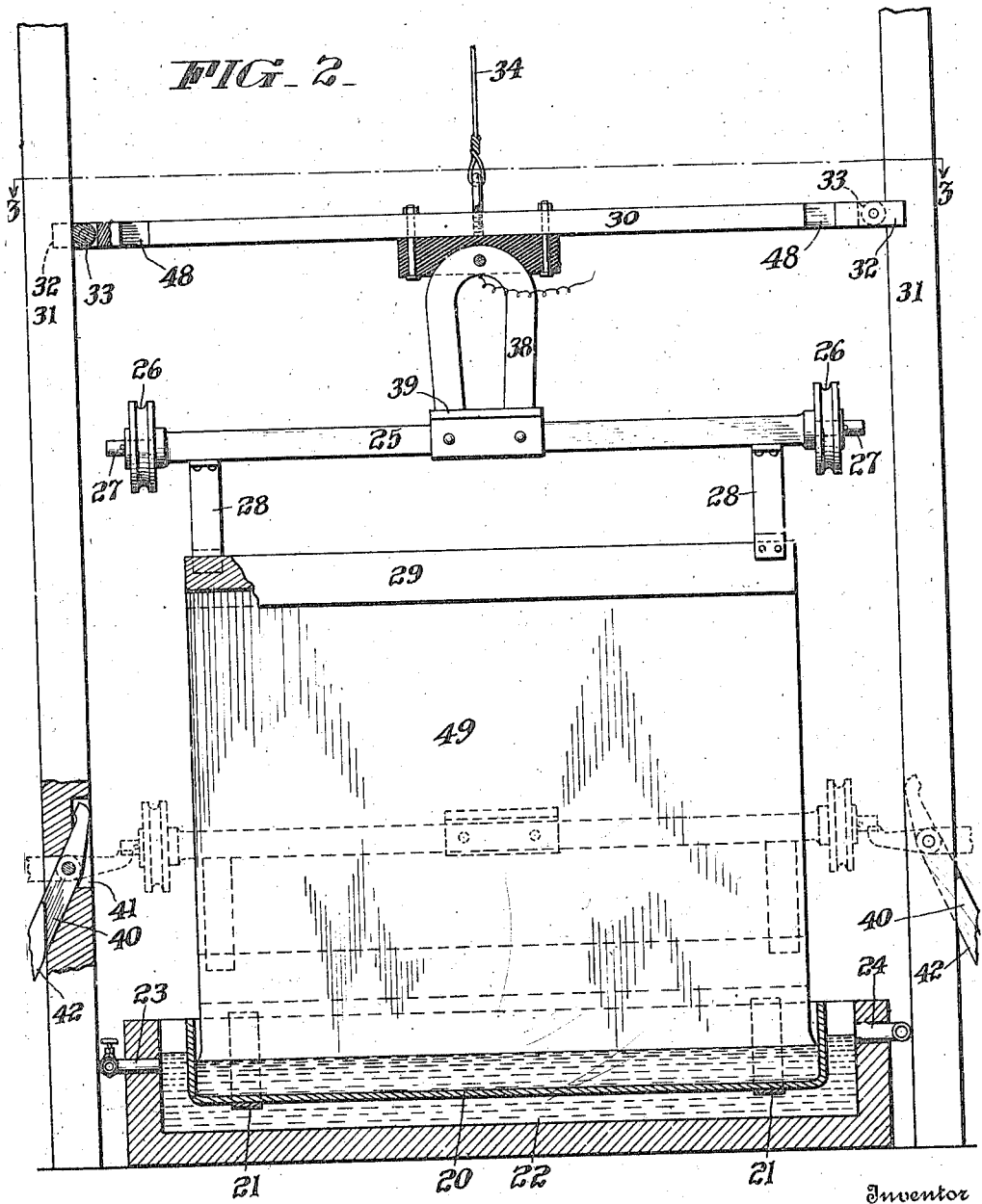

R. SUMMERSGILL.
WINDOW GLASS APPARATUS.
APPLICATION FILED AUG. 10, 1916.
1,220,906.
Patented Mar. 27, 1917.
4 SHEETS—SHEET 3.
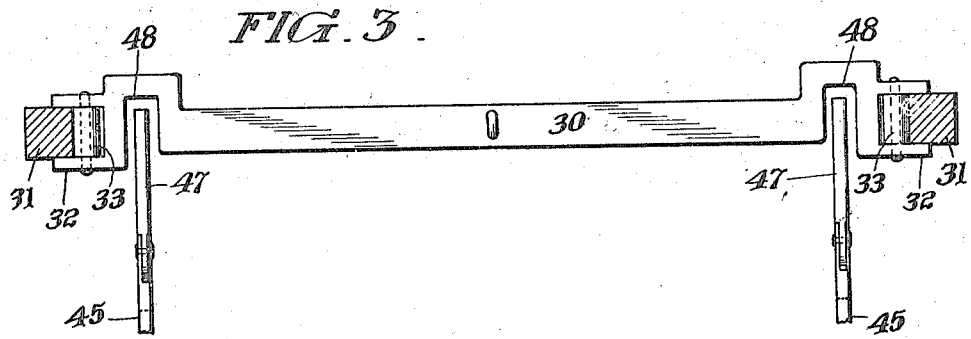
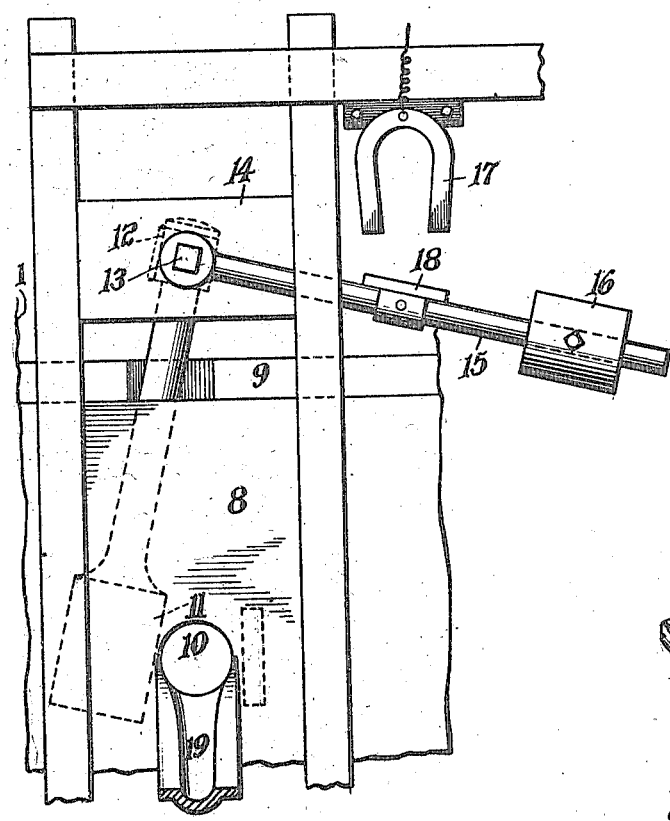
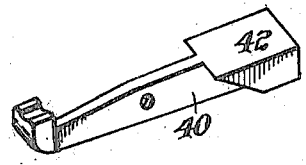
Inventor
Richard Summersgill.
Witness
Eleanor F. Murray.
By
Foster and Webster
Attorneys R. SUMMERSGILL.
WINDOW GLASS APPARATUS.
APPLICATION FILED AUG. 10, 1916.
1,220,906.
Patented Mar. 27, 1917.
4 SHEETS—SHEET 4.
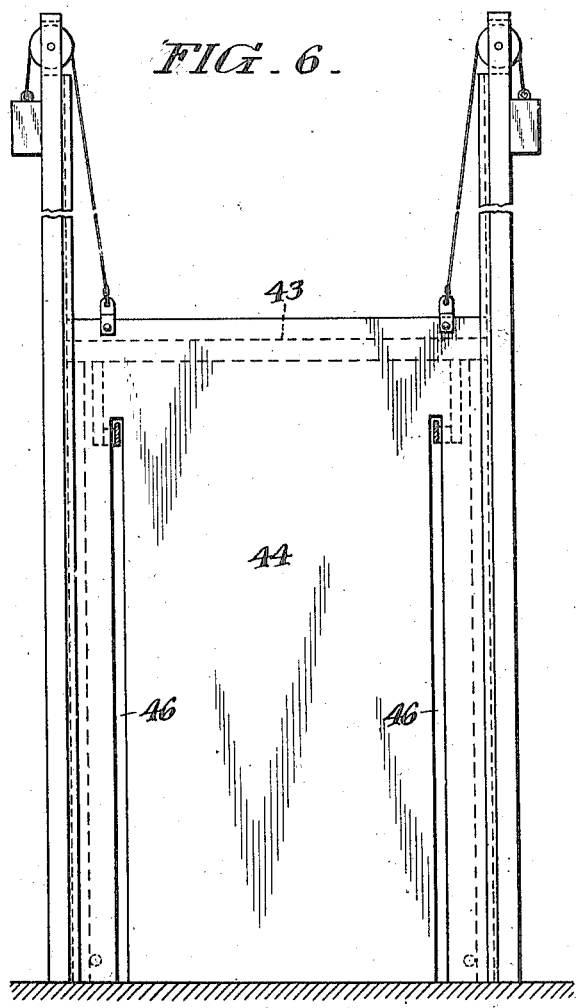
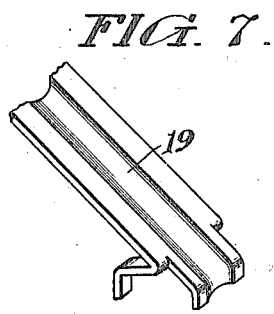
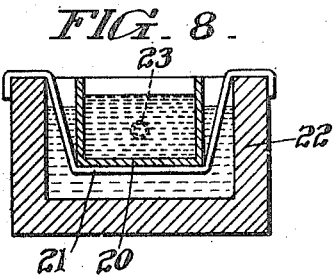
Witness
Eleanor F. Murray
Inventor
Richard Summersgill.
By Foster and Webster
Attorneys

UNITED STATES PATENT OFFICE.

RICHARD SUMMERSGILL, OF KANE, PENNSYLVANIA.

WINDOW-GLASS APPARATUS.

1,220,906.

Specification of Letters Patent. Patented Mar. 27, 1917.

Application filed August 10, 1916. Serial No. 114,183.

*To all whom it may concern:*

Be it known that I, RICHARD SUMMERSGILL, a citizen of the United States, residing at Kane, in the county of McKean and State of Pennsylvania, have invented certain new and useful Improvements in Window-Glass Apparatus, of which the following is a specification.

My invention relates to improvements in window glass apparatus, the object of the invention being to provide an improved apparatus which draws the glass into straight sheets and suspends the same from improved bait frames which are run into an annealing furnace. Heretofore window glass and other similar sheet glass has been universally made, first in a cylinder, then cut and flattened. With my improved apparatus this laborious and expensive process is done away with and the sheets are drawn vertically from a trough containing the molten glass, and the sheets are maintained suspended from an improved arrangement of bait frame, having wheels or rollers thereon which run on a track into the annealing furnace.

A further object is to provide means for regulating and controlling the flow of molten glass and improved means for operating the bait frames.

With these and other objects in view the invention consists in certain novel features of construction and combinations and arrangements of parts as will be more fully hereinafter described and pointed out in the claims.

In the accompanying drawings:

Fig. 2 is an enlarged fragmentary view, partly in elevation and partly in section taken on the line 2—2 of Fig. 1.

Fig. 3 is a view in transverse section on the line 3—3 of Fig. 2.
Fig. 4 is an enlarged fragmentary view, partly in elevation and partly in section on the line 4—4 of Fig. 1.

Fig. 5 is a perspective view of one of the pivoted holders 40.
Fig. 6 is a view in end elevation of the annealing furnace, the track rails being shown in section.

Fig. 7 is a perspective view of the glass channel 19, and Fig. 8 is an enlarged view in transverse section through the glass trough.

Figure 1:
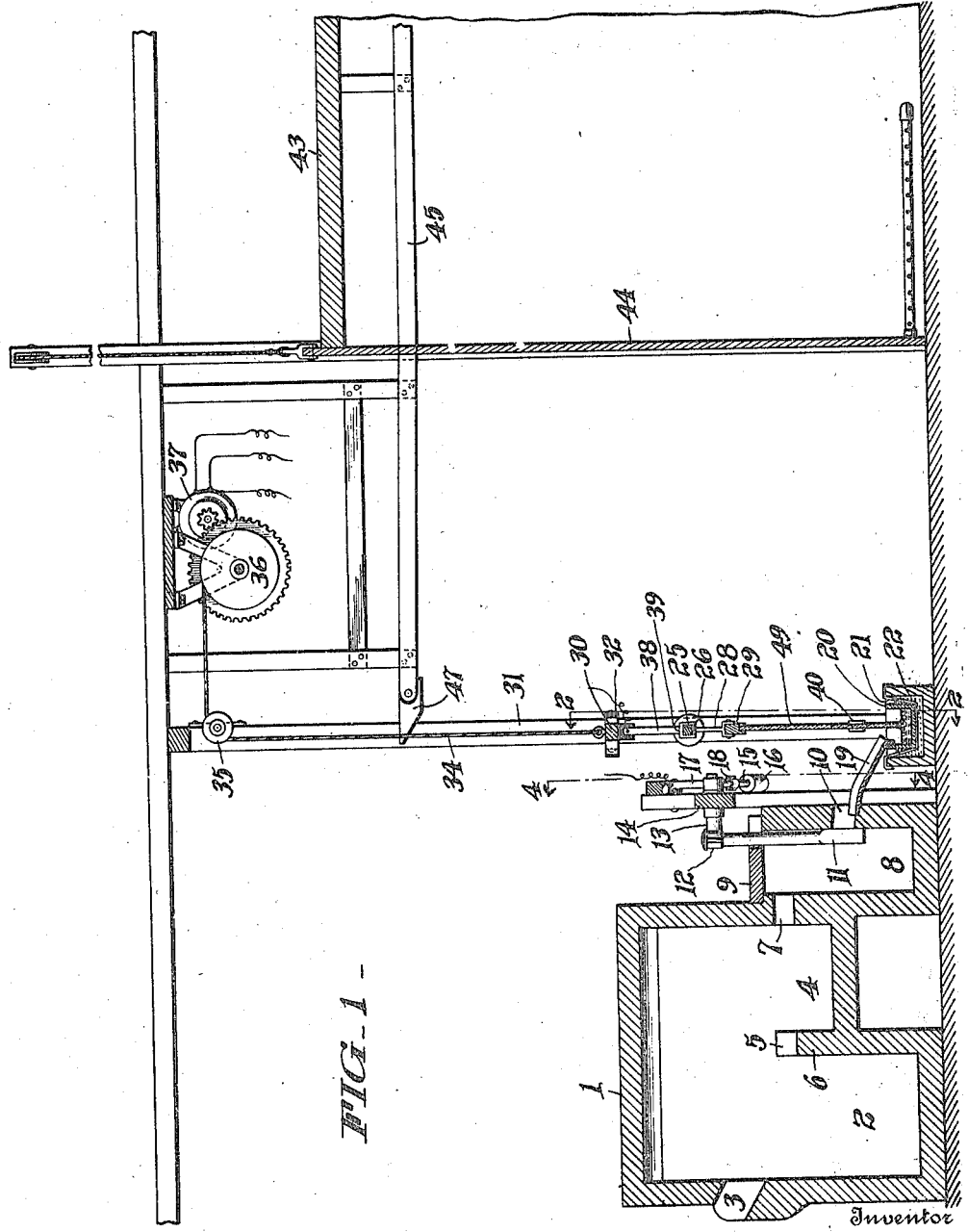
Figure 1 is a view in longitudinal section illustrating my improved apparatus.

1 represents the melting furnace having a relatively large compartment 2 at one end into which the raw material is fed through an inlet opening 3 and overflows into a smaller tank 4 through a recess 5 in the dividing wall 6.

Molten glass flows from tank 4 through outlet 7 into a supply reservoir 8 covered by fire brick or tile 9 and having an outlet 10 controlled by a gate 11. The gate 11 is secured by a split-collar 12 to a short shaft 13 which is supported in a frame 14 and is provided with a crank arm 15 having an adjustable weight 16 thereon, the latter serving to open the gate 11.

An electromagnet 17 supported on frame 14 and controlled in any approved manner, attracts a block 18 on arm 15 and closes the gate 11 so that it will be understood that when the magnet is energized, the gate will be closed and when the electric circuit is opened, the gate will be opened by the weight 16 and maintained open until the magnet is again energized.

The molten glass flowing through outlet 10 enters a grooved channel 19 and is guided thereby into a trough 20. Trough 20 is supported on suitable hangers 21 within a water tank 22, the latter having an inlet pipe 23 and an outlet pipe 24 to maintain the proper level of water in tank 22 to maintain trough 20 cool, and prevent sticking of the glass thereto.

25 represents one of my improved bait frames which comprises a bar having grooved wheels 26 at its ends supported on axle stubs 27. Hangers 28 suspended from the bait frame support bait 29 which is adapted to enter the molten glass in trough 20 and draw the glass upwardly in sheet form as will hereinafter appear.

A lifting bar 30 is guided in its vertical movement by posts 31 which receive the bifurcated ends 32 of bar 30, and against which rollers 33 on the bar are adapted to move.

The bar 30 is connected to a cable 34 passed over an idle pulley 35 and wound on a drum 36. I have shown an ordinary electric motor 37 for turning the drum 36, but it is to be understood that this drum is to be located at any suitable point, and to be operated in any approved manner to move the bar 30.

An electromagnet 38 is carried by bar 30 and attracts a metal block 39 on bait frame 25. Pivoted holders 40 are supported in openings 41 in posts 31 and have weighted outer ends 42 which normally position the holders 40 as shown in full lines in Fig. 2. When it is desired to position the bait frame 25 over trough 20, the holders are moved to the position shown in dotted lines in Fig. 2 to receive the bait frame ready for engagement by the electromagnet 38.

43 represents an annealing furnace having a vertically movable door 44 at one end and having horizontal tracks 45 which extend through slots 46 in the door 44. These tracks 45 at their outer ends are provided with pivoted extensions 47 which permit the wheels 26 of bait frame 25 to move upwardly, but prevent downward movement of the wheels and guide the wheels on to the track.

The bar 30 is preferably recessed as shown at 48 to permit the same to pass extensions 47 and the latter are permitted an upward pivotal movement, but are prevented any downward movement beyond their alinement with the track 45.

The operation is as follows: The bait frame is supported on the holders 40 as shown in dotted lines in Fig. 2. The molten glass is then permitted to flow into trough 20 but causing the opening of gate 11, through the medium of electromagnet 19. Bar 30 is then lowered until its electromagnet 38 engages block 39 when the electromagnet 38 is energized to attract the block and hold the bait frame. Bar 30 is then elevated slightly to permit the holders 40 to swing to their full line positions in Fig. 2, when the bait frame is lowered until the bait 29 engages the molten glass. The bait frame is then elevated, drawing the sheet glass shown at 49 upwardly. The wheels 26 then find lodgment on the upper face of track extensions 47 and run along the track into the annealing furnace when released from the magnet.

It is desirable that there shall be considerable space between the end of the track 45 and the annealing furnace, but I of course, do not limit myself in this particular.

Various slight changes may be made in the general form and arrangement of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. An apparatus of the character described, comprising a receptacle adapted to contain molten glass, movable holding devices above the receptacle, a bait frame adapted to be supported by said holding devices in set position above the receptacle, and reciprocating means adapted to lower the bait frame below said holding devices and into the receptacle, said holding devices adapted to move out of the path of the bait frame.

2. An apparatus of the character described, comprising a receptacle adapted to contain molten glass, movable holding devices above the receptacle, a bait frame adapted to be supported by said holding devices in set position above the receptacle, and reciprocating means adapted to lower the bait frame below said holding devices and into the receptacle, said holding devices adapted to move out of the path of the bait frame, said holding devices having weighted ends normally positioning said holding devices out of the path of the bait frame.

3. An apparatus of the character described, comprising a trough, means for directing molten glass into the trough, elevated horizontal tracks, a bait frame, means for holding the bait frame in set position above the trough, and vertically reciprocating means constructed to move the bait frame from set position, then lower the same into operative engagement with the glass of the trough, and then elevate the bait frame and deposit the same on the track.

In testimony whereof I have signed my name to this specification in the presence of two subscribing witnesses.

RICHARD SUMMERSGILL.

Witnesses:
C. J. MICHEAVE,
N. E. ROSS.